United States Patent
Kawata et al.

(10) Patent No.: US 8,040,540 B2
(45) Date of Patent: Oct. 18, 2011

(54) COMMUNICATION INFORMATION PROCESSING SYSTEM

(75) Inventors: Yuichi Kawata, Kanagawa (JP); Hiroaki Yamamoto, Kanagawa (JP); Masakazu Kawashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 868 days.

(21) Appl. No.: 12/060,895

(22) Filed: Apr. 2, 2008

(65) Prior Publication Data

US 2009/0073490 A1  Mar. 19, 2009

(30) Foreign Application Priority Data

Sep. 18, 2007  (JP) ................................ 2007-240965

(51) Int. Cl.
*G06F 3/12* (2006.01)
(52) U.S. Cl. ..................................... 358/1.13; 358/1.15
(58) Field of Classification Search ................. 358/1.15, 358/1.13, 1.18, 400, 401, 1.16, 404, 444, 358/468
See application file for complete search history.

(56) References Cited

U.S. PATENT DOCUMENTS

| | | | | |
|---|---|---|---|---|
| 6,574,759 | B1 * | 6/2003 | Woo et al. | 714/718 |
| 7,586,789 | B2 * | 9/2009 | Hsieh et al. | 365/185.22 |
| 2003/0117992 | A1 * | 6/2003 | Kim et al. | 370/349 |
| 2006/0224698 | A1 * | 10/2006 | Shiobara et al. | 709/219 |
| 2007/0171927 | A1 * | 7/2007 | Paik et al. | 370/402 |
| 2008/0239389 | A1 * | 10/2008 | Kudo | 358/1.15 |

FOREIGN PATENT DOCUMENTS

| | | | |
|---|---|---|---|
| EP | 1274005 | * | 1/2003 |
| JP | 2000-069256 A | | 3/2000 |

* cited by examiner

*Primary Examiner* — Jerome Grant, II
(74) *Attorney, Agent, or Firm* — Sughrue Mion, PLLC

(57) ABSTRACT

A communication information processing device that includes a reception component, an image processing component, a memory component and a control component is provided. The reception component receives communication information through an external communication line. The image processing component performs image processing on image information. The memory component is provided for memorizing image information for image processing by the image processing component, and that memorizes image information and the communication information received by the reception component. The control component, when a pre-specified setting condition is satisfied, controls the memory component so as to delete the communication information memorized in the memory component and to memorize image information to be used by the image processing component as a priority.

16 Claims, 7 Drawing Sheets

COMMUNICATION INFORMATION PROCESSING SYSTEM

CROSS-REFERENCE TO RELATED APPLICATION

This application is based on and claims priority under 35 USC 119 from Japanese Patent Application No. 2007-240965 filed Sep. 18, 2007.

BACKGROUND

1. Technical Field

The present invention relates to a communication information processing device, a communication information processing system, and a recording medium storing a communication information processing program.

2. Related Art

With the spread of computers, situations in which image forming devices such as printers and the like are shared across networks have been increasing. At such an image forming system which is common to a number of computers across a network, if no data is received from the computers for a period specified beforehand, control may be performed to stop power supplies to part of the image forming device, for example, portions with large power consumptions such as a fixing section of the image forming device, a CPU and the like, and thus switch into an energy-saving mode.

However, in the energy-saving mode, power is supplied only to a communication control section and power is not supplied to a CPU, main memory, bus bridge, printer output engine and the like. When the communication control section receives data through the network at such a time, the data is temporarily saved in a communications-specific buffer. However, because the bus bridge and the like are not electrified, it is not possible to transfer the received data to the main memory by DMA (direct memory access), and it is not possible to receive data reliably.

SUMMARY

According to an aspect of the invention, there is provided a communication information processing device that includes: a reception component that receives communication information through an external communication line; an image processing component that performs image processing on image information; a memory component that is provided for memorizing image information for image processing by the image processing component, and that memorizes image information and the communication information received by the reception component; and a control component that, when a pre-specified setting condition is satisfied, controls the memory component so as to delete the communication information memorized in the memory component and to memorize image information to be used by the image processing component as a priority.

BRIEF DESCRIPTION OF THE DRAWINGS

An exemplary embodiment of the present invention will be described in detail based on the following figures, wherein.

DETAILED DESCRIPTION

Figure 1:
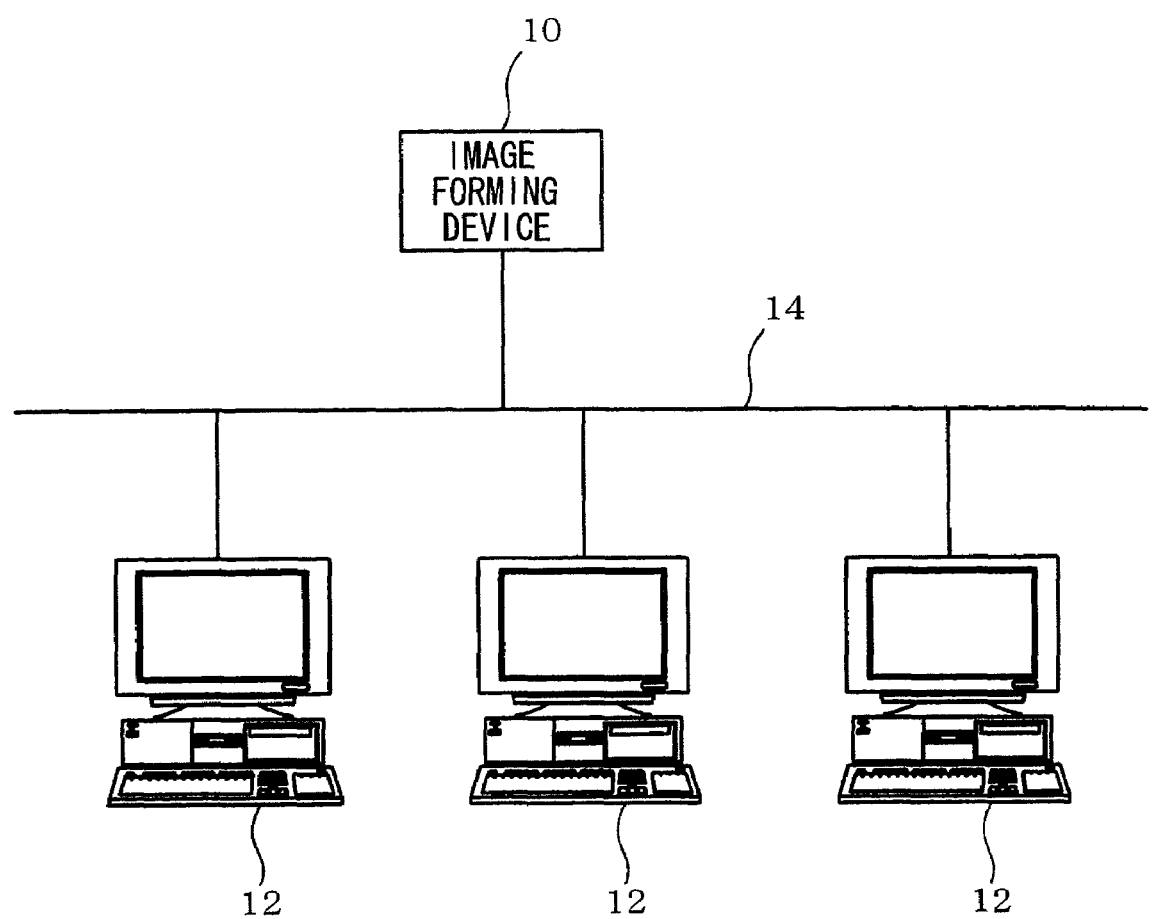
FIG. 1 is a schematic view of a network system that includes an image forming device relating to an exemplary embodiment of the present invention.

Herebelow, an example of an exemplary embodiment of the present invention will be described in detail with reference to the drawings. FIG. 1 is a schematic view of a network system including an image forming device of the present invention, and FIG. 2 is a block diagram showing structure of the image forming device relating to the exemplary embodiment of the present invention.

An image forming device 10 relating to the exemplary embodiment of the present invention is connected to a network 14, to which a plurality of personal computers 12 are connected. Image data and operating instructions for forming images, and communication data for network connections and the like, are transmitted from the personal computers 12 to the image forming device 10. When such data is being transmitted, the respective personal computer 12 divides the data into a plurality of packets for transmitting the data, and the image forming device 10 performs processing to join the divided packets and reconstruct the original data. Although the present exemplary embodiment illustrates an example in which respective devices are connected by a network, this is not a limitation. It is also possible to employ communication systems which are connected by other data propagation methods such as, for example, telephone lines and the like.

Figure 2:
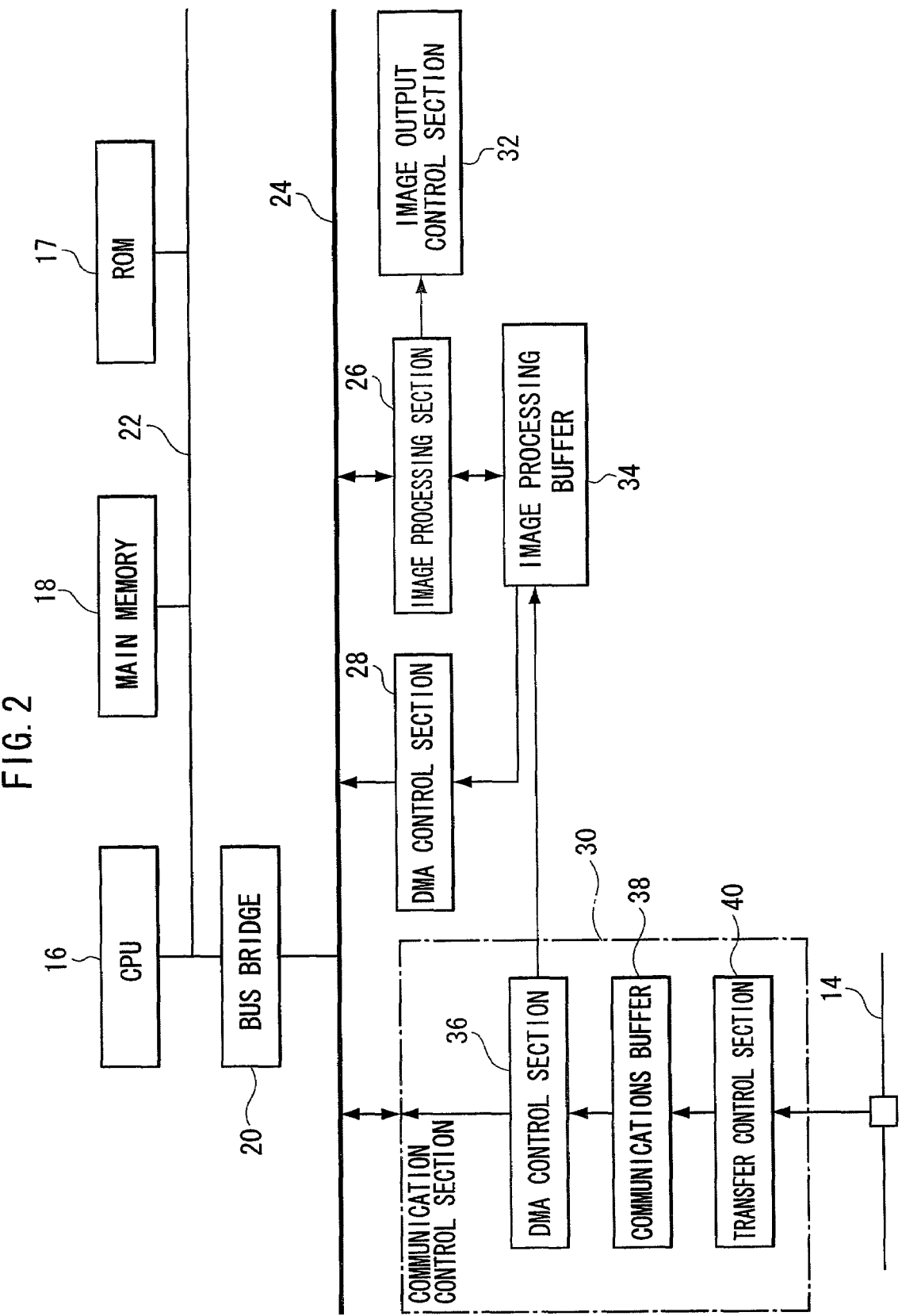
FIG. 2 is a block diagram showing structure of the image forming device relating to the exemplary embodiment of the present invention.

The image forming device 10 is structured to include one or a plurality of circuit boards, connected by a PCI bus 24 as shown in FIG. 2. The image forming device 10 is provided with a CPU 16, ROM 17 and main memory 18. The CPU 16 is a structure for controlling operations of the device as a whole. The ROM 17 serves as a memory medium in which a basic program such as an OS (operating system) and the like are memorized. The main memory 18 serves as a working area for the CPU 16. The CPU 16 and the main memory 18 are connected via a bus bridge 20 and a CPU bus 22.

The image forming device 10 is also provided with a communication control section 30, which is a structure for receiving image data, operating instructions, communication data and so forth from external devices such as the network-connected personal computers 12 and the like.

Circuit boards connected to the PCI bus 24 are, for example, an image processing section 26, a DMA control section 28, the communication control section 30 and so forth, and various operations thereof are controllable by control from the CPU 16.

An image output control section 32 and an image processing buffer 34 are connected to the image processing section 26. The image processing section 26 receives the image data saved at the main memory 18 and performs various kinds of image processing for image formation. Image data received from the main memory 18, image data received from an external device or the like, and the like is temporarily saved in the image processing buffer 34, and the image output control section 32 implements image formation in accordance with image data which has been processed by the image processing section 26.

In the present exemplary embodiment, as well as image data for implementing image formation, communication data for communicating with an external device via the network 14, and the like, is also saved at the image processing buffer 34. The communication data for communicating with an external device may be, for example: ARP (address resolution protocol) packets, which are command data for acquiring a MAC address from an IP address; SNMP (simple network management protocol) packets for monitoring and controlling a communication device connected to a network through the network; and the like. The DMA control section 28 controls such that the communication data saved in the image processing buffer 34 is outputted to the main memory 18 and can be processed by the CPU 16.

The communication control section 30 is connected to the network 14, which is a local network, an intranet, the Internet or the like. The communication control section 30 sends and receives data to and from an external device via the network 14. To be more specific, the communication control section 30 is provided with a DMA control section 36, a communications buffer 38, a transfer control section 40 and the like.

The transfer control section 40 controls transmissions and receptions of communication data for communication connections with external devices via the network 14, image data for image formation, which is received from the external devices, and the like.

The communications buffer 38 temporarily memorizes communication data, image data and the like received by the transfer control section 40. The various kinds of data that have been memorized in the communications buffer 38 are transferred to the main memory 18 or the image processing buffer 34 by the DMA control section 36. In the present exemplary embodiment, the DMA control section 36 alters the transfer destination of the data in accordance with below-described power supply modes of the image forming device 10.

In the present exemplary embodiment, the image forming device 10 features a usual mode, in which a power supply supplies power to necessary sections, and an energy-saving mode, which limits power supplies to pre-specified portions relative to the usual state. The usual mode is a state in which power is supplied to respective structures, and in this state it is possible to perform image formation processing immediately in response to an operation instruction. That is, when image data which has been divided into packets is received through the network 14, the packets are temporarily saved in the communications buffer 38 and are promptly DMA-transferred from the communications buffer 38 to the main memory 18. Thereafter, when all the packets have been transferred to the main memory 18, the packets are processed for joining, and transferred to the image processing section 26. Upon receiving the data, the image processing section 26 converts the data to a data format for image formation and, if necessary, performs other image processing. The image processing section 26 then outputs the image data to the image output control section 32, and image formation is controlled by control of the image output control section 32.

On the other hand, in the energy-saving mode, some or all of power supply, clock provision and the like to, for example, the CPU 16 and the bus bridge 20 are stopped, and the main memory 18 is put into a self-refreshing mode in which the main memory 18 itself periodically reads and rewrites stored data. In addition, power supplies to a fixing section, a motor and the like of the image output control section 32 are restricted, and power consumption is restrained. The energy-saving mode is a state in which, due to control for energy saving, at least DMA-transfers of data from the communications buffer 38 to the main memory 18 are not possible. Various kinds of data received through the network 14 are saved to the communications buffer 38 and the image processing buffer 34. Hence, the data is DMA-transferred to the main memory 18 at a time of returning from the energy-saving mode to the usual mode.

In the usual mode, the image forming device 10 switches from the usual mode to the energy-saving mode, to reduce power consumption, when a condition is satisfied, such as when reception of data, operation of the image forming device 10 and the like have not been carried out for more than a pre-specified duration, or the like. In the energy-saving mode, the image forming device 10 returns from the energy-saving mode to the usual mode when a condition is satisfied, such as when image data is received through the network 14, an operation of the image forming device 10 is carried out, or the like.

The image forming device 10 relating to the present exemplary embodiment further features a condition-checking mode for responding when a condition-checking signal enquiring about a condition of the image forming device 10 is received from an external device such as one of the personal computers 12 or the like. In the energy-saving mode, when a condition-checking signal is received from an external device such as the personal computer 12 or the like, the communication control section 30 reports the received condition-checking signal to the CPU 16. Accordingly, the CPU 16 activates the main memory 18 and the bus bridge 20, checks conditions of the image forming device 10, and returns a response signal including information on the conditions. In the condition-checking mode of the energy-saving mode, power is not supplied to the fixing section, the motor and the like of the image forming device 10.

Now, in the image forming device 10 relating to the present exemplary embodiment of the invention as described above, in the energy-saving mode, various kinds of data received through the network 14 are saved at the image processing buffer 34. At a time of returning to the usual mode and performing image formation, if the various kinds of data are still in the image processing buffer 34, image formation by the image processing section 26 will be delayed.

That is, a volume of memory that can be used by the image processing buffer 34 is reduced by the various kinds of data having been memorized. Therefore, if the image processing section 26 tries to employ the image processing buffer 34 for, for example, temporary storage, it may not be possible to guarantee a sufficient memory volume until the various kinds of data have been deleted from the image processing buffer 34, and image formation by the image processing section 26 may be delayed.

Accordingly, in the present exemplary embodiment, when a predetermined condition is satisfied, a function for deleting data accumulated in the image processing buffer 34 is delayed, usage right is passed to the image processing section 26—regardless of network loading, CPU capacity and the like—and image formation is given priority.

Predetermined conditions for deleting data accumulated in the image processing buffer 34 that can be applied are: at a time when an image formation instruction is identified and the image processing buffer 34 is to be used; when a quantity of communication packets accumulated in the image processing buffer 34 has increased to above a predetermined quantity; when data from the image processing buffer 34 does not stop for a pre-specified duration; when a number of packets that have been accumulated is increasing; and so forth. In the present exemplary embodiment, as the data to be deleted, communication information that will be re-sent is deleted. Communication information that will be re-sent includes information based on a communication system that transmits a packet, waits for a reception condition response from the receiving side, and re-sends the packet if the transmission fails. For example, in TCP/IP (transmission control protocol/Internet protocol), when the receiving side receives a good packet, the receiving side returns a response acknowledgement signal, known as an ACK, to the transmitting side. The transmitting side looks at the response acknowledgement and transmits the next packet. However, if there is no response from the receiving side, the transmitting side counts time after transmitting the packet, and when the time exceeds a certain duration and a "timeout" is identified, re-transmits the packet to the receiving side. An exemplary embodiment can be illustrated in which data received in TCP/IP using this system is the accumulated data that is to be deleted.

Figure 3:
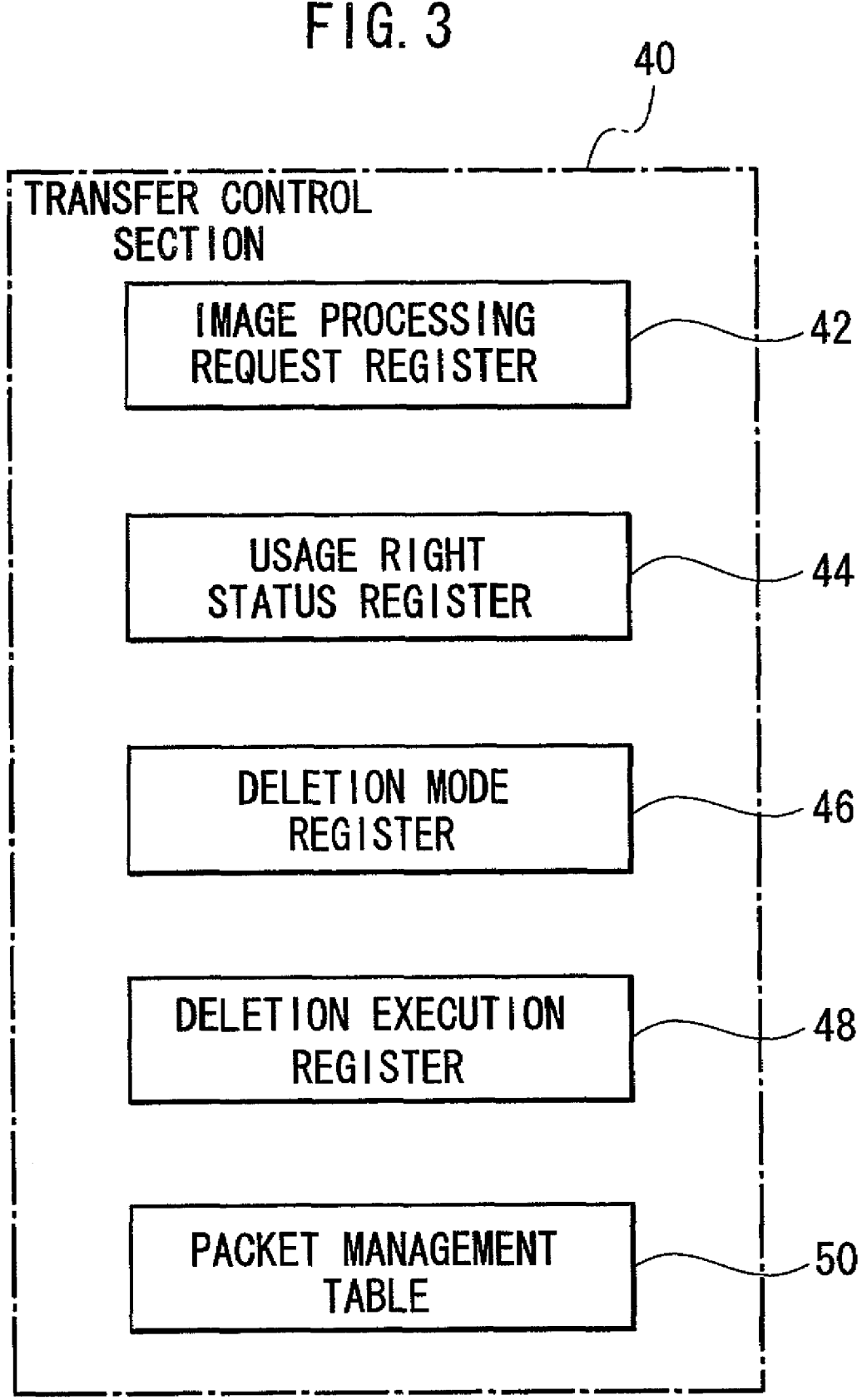
FIG. 3 is a block diagram showing detailed structure of a transfer control section.

Specifically, as shown in FIG. 3, the transfer control section 40 is provided with an image processing request register 42, a usage right status register 44, a deletion mode register 46, a deletion execution register 48 and a packet management table 50, for deleting data accumulated in the image processing buffer 34.

When a request to perform image processing, such as an image formation request or the like, is received, a data 'one' is written to the image processing request register 42, and when there is no request, a data 'zero' is written thereto.

If the image forming device 10 is in the energy-saving mode or suchlike, a 'zero' indicating that various kinds of data will be accumulated in the image processing buffer 34 is written to the usage right status register 44, and usage right is given to the network 14. When there is no effective data in the image processing buffer 34, a 'one' is written to the usage right status register 44 and usage right is passed to the image processing section 26.

A unit of deletion of data accumulated in the image processing buffer 34 is specified in advance, for example, from an operation panel or the like of the image forming device 10, and is memorized. When deletion of all packets in the image processing buffer 34 is specified, a 'zero' is written to the deletion mode register 46, and when single packets are to be deleted, a 'one' is written to the deletion mode register 46.

When a 'one' is written to the usage right status register 44, a 'one' is written to the deletion execution register 48, to delete data in the image processing buffer 34. A 'zero' is written to the deletion execution register 48 for times other than times of deletion.

The packet management table 50 memorizes numbers of packets in the buffer, sizes and error information of the packets, a used buffer area, and the like. Here, the size, error information and the like of each packet may be memorized in the buffer together with the packet.

Figure 4:
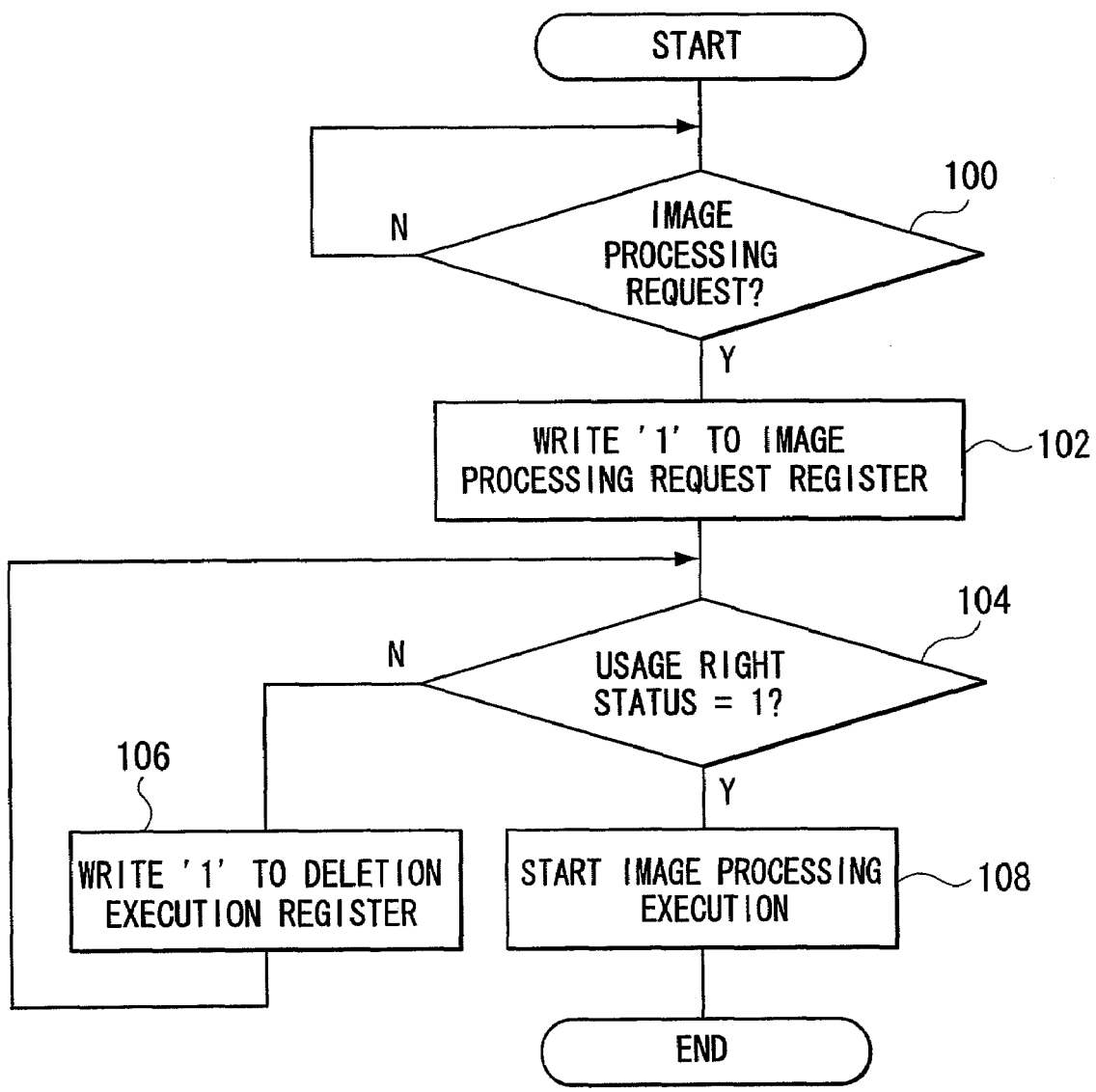
FIG. 4 is a flowchart showing an example of a flow of processing relating to deletion of an image processing buffer when an image forming instruction arises and an image processing request arises.

Next, deletion of data accumulated in the image processing buffer 34, in the energy-saving mode of the image forming device 10 relating to the exemplary embodiment of the present invention which is structured as described above, will be described in detail. FIG. 4 is a flowchart showing an example of a flow of processing relating to deletion of the image processing buffer 34 when an image processing instruction arises and an image processing request arises.

Firstly, in step 100, the transfer control section 40 determines whether or not there is an image processing request. For this determination, the transfer control section 40 determines whether or not an image processing instruction or the like has been received from the personal computers 12 through the network 14. The processing waits until the determination is positive, and then advances to step 102. While there is no image processing request, data memorized in the communications buffer 38 is transferred to the image processing buffer 34, and various kinds of data are memorized in the image processing buffer 34.

Then, in step 102, when an image processing request has arisen, power supplies to the CPU 16, the bus bridge 20 and the main memory 18 are restarted, a 'one' is written to the image processing request register 42 by the CPU 16, and the processing advances to step 104.

In step 104, the transfer control section 40 determines whether or not a value memorized in the usage right status register 44 is a 'one'. If this determination is negative, the processing advances to step 106, and if it is positive, the processing advances to step 108.

In step 106, a 'one' is written to the deletion execution register 48 of the transfer control section 40 by the CPU 16. Hence, data that has been accumulated in the image processing buffer 34 is deleted, in accordance with a value that has been written to the deletion mode register 46, and the processing returns to step 104. Here, when the data in the image processing buffer 34 is deleted, a 'one' is written to the usage right status register 44 and the determination of step 104 will be positive. If a 'one' has been written to the deletion mode register 46, a 'one' is written to the usage right status register 44 when a region of a predetermined amount is assured for image processing. In the above-described exemplary embodiment, if a 'one' has been set as the value of the deletion mode register 46 and single packets are to be deleted, the packet management table 50 is referred to, to identify borders between the packets while performing the deletion.

In step 108, authorization for usage of the image processing buffer 34 transfers to the image processing section 26 and execution of image processing is commenced, and this processing sequence ends.

In this image forming device 10 of the exemplary embodiment of the present invention, while the value of the image processing request register 42 is 'zero' and there are no image processing requests, the transfer control section 40 employs the communications buffer 38 and the image processing buffer 34 as buffers for network reception, temporarily saves received data that is received through the network 14 in the communications buffer 38, and DMA-transfers the data to the image processing buffer 34 with the DMA control section 36. Thus, even if the buffer volume increases, a load on the CPU 16 temporarily becomes high and a process is kept waiting for received data, an overflow or the like of data in the communications buffer 38 is prevented. Moreover, because the image processing buffer 34 is employed while the image forming device 10 is in the energy-saving mode, losses of packets are avoided even in a system in which it takes some time to return from the energy-saving mode to the usual mode.

On the other hand, when the CPU 16 identifies an image processing request, and it is judged that the image processing buffer 34 will be used, the CPU 16 writes a 'one' to the image processing request register 42 in the transfer control section 40. As a result, a packet deletion operation is started by the transfer control section 40, and packets that have been accumulated in the image processing buffer 34 are deleted in accordance with the setting of the deletion mode register 46. Thereafter, it is confirmed that the value of the usage right status register 44 has switched to 'one', and image processing by the image processing section 26 is started by control from the CPU 16. That is, in a case in which the image processing buffer 34 is used, usage right thereof is switched from the network 14 to the image processing section 26.

Figure 5:
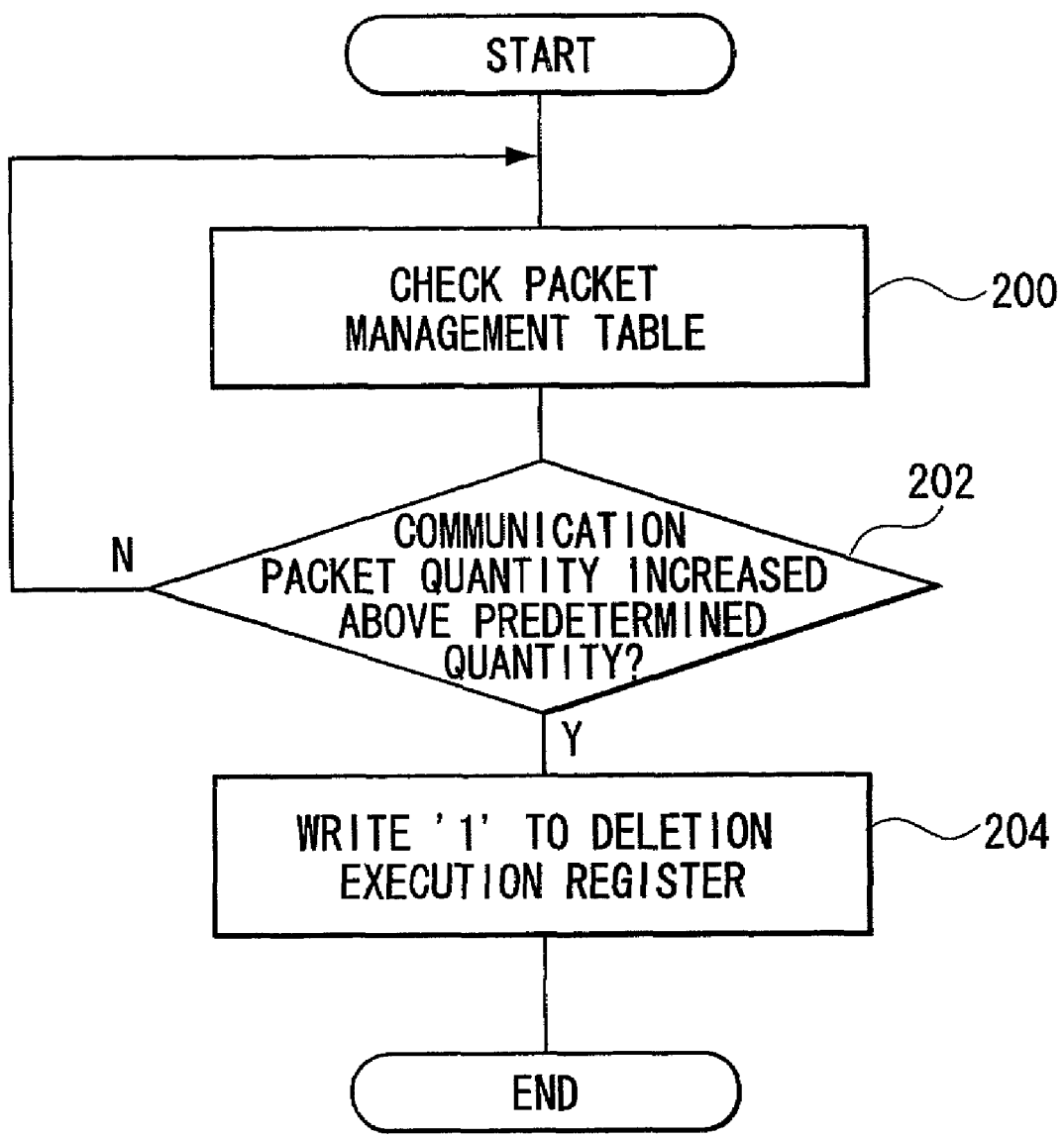
FIG. 5 is a flowchart showing an example of a flow of processing at a time of deletion when a packet quantity in the image processing buffer has grown above a predetermined quantity.

Next, processing at a time of deletion in a case in which a quantity of communication packets accumulated at the image processing buffer 34 has increased to equal to or greater than a predetermined quantity will be described. FIG. 5 is a flowchart showing an example of a flow of processing at the time of deletion when the quantity of packets in the image processing buffer 34 has grown beyond the predetermined quantity. The flowchart of FIG. 5 describes a case of carrying out the processing in the condition-checking mode.

Firstly, in step 200, the packet management table 50 is checked by the CPU 16, and the processing advances to step 202.

In step 202, it is determined by the CPU 16 whether or not a quantity of communication packets saved at the image processing buffer 34 has grown beyond the predetermined quantity (for example, a memory volume specified beforehand for memorizing communication information, or suchlike). Specifically, the CPU 16 determines whether or not the quantity of communication packets has grown beyond the predetermined quantity on the basis of results of checks of the packet management table 50. If this determination is negative, the processing returns to step 200, and if the determination is positive, the processing advances to step 204.

In step 204, a 'one' is written to the deletion execution register 48 of the transfer control section 40 by the CPU 16. Hence, the data accumulated at the image processing buffer 34 is deleted in accordance with the value that has been written to the deletion mode register 46, and this sequence of processing ends.

In such manner, in the image forming device 10 relating to the present exemplary embodiment, if a quantity of packets does not decrease for a predetermined duration or if a quantity of packets increases, communication information in the image processing buffer 34 for which re-sending is assured is deleted. Therefore, even if abnormal conditions arise in the network 14 such that communication information increases and is not processed, a proper recovery to a usual state is possible.

Anyway, in the exemplary embodiment described above, the CPU 16 determines whether or not the quantity of communication packets saved at the image processing buffer 34 has increased to above the predetermined quantity for deleting data. However, this is not limiting. It is also possible to determine whether or not the quantity of packets has not decreased for a predetermined duration or the quantity of packets has increased (an increase in an area of the image processing buffer 34 that is being used), and perform deletion if this determination is positive. Specifically, packets may be deleted if, after switching into the condition-checking mode and launching the system, the image processing buffer is not empty within 1 second, and packets may be deleted if, after switching into the condition-checking mode and launching the system, an accumulated number of packets is maintained and the currently accumulated number of packets has increased after processing of 10 packets.

Figure 6:
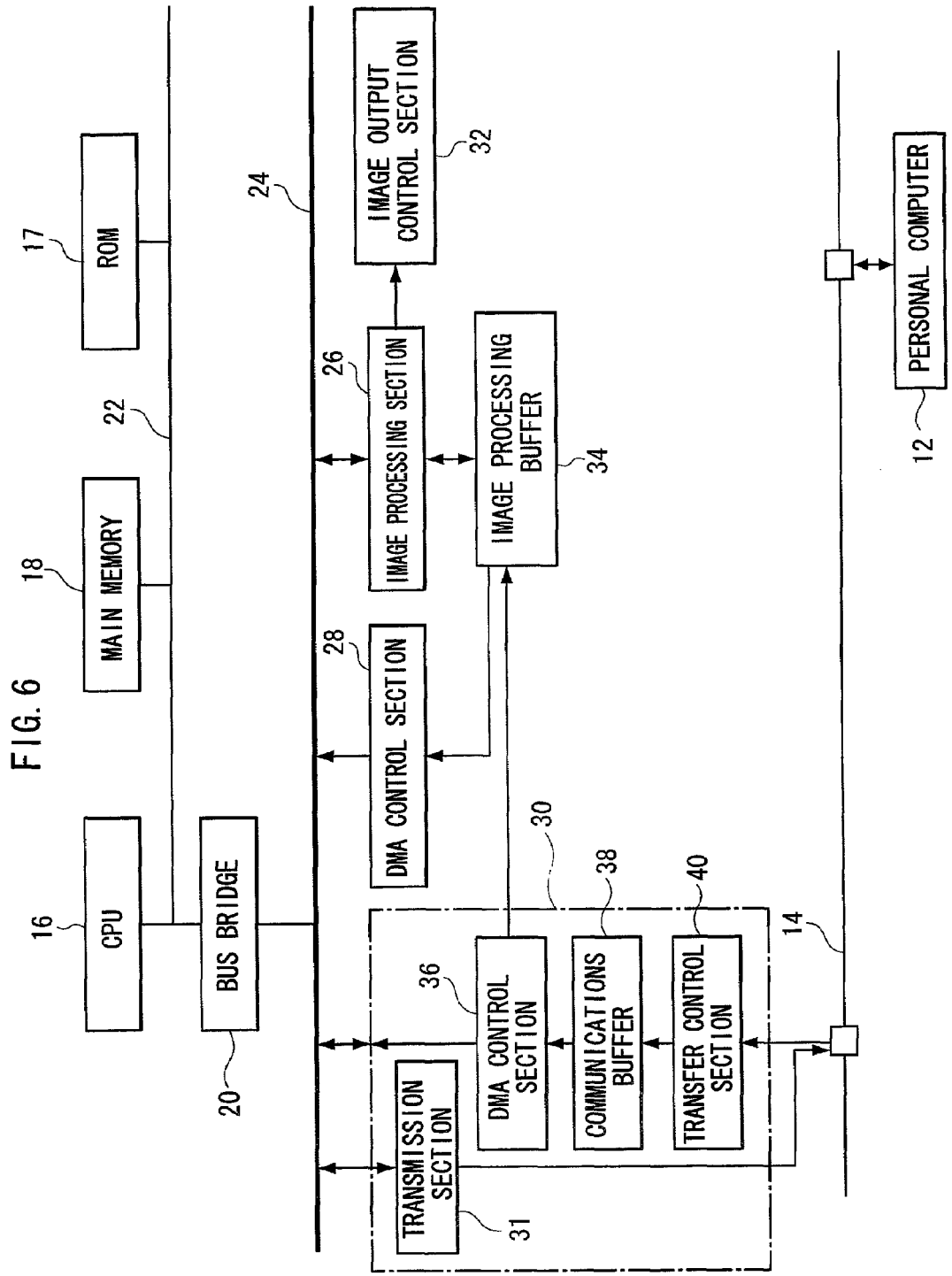
FIG. 6 is a diagram showing a variant example of the image forming device relating to the exemplary embodiment of the present invention.

Moreover, in the exemplary embodiment described above, a case in which communication information is deleted and automatically re-sent has been described. However, it is also possible to request re-sending of communication information when the communication information has been deleted. For example, as shown in FIG. 6, a transmission section 31 may be provided at the communication control section 30, and when communication information in the image processing buffer 34 has been deleted, the CPU 16 may implement requests for re-sending of communication information to external devices such as the personal computers 12 and the like. Here, structures that are the same in FIG. 6 as in FIG. 2 are assigned the same reference numerals and will not be described in detail.

Figure 7:
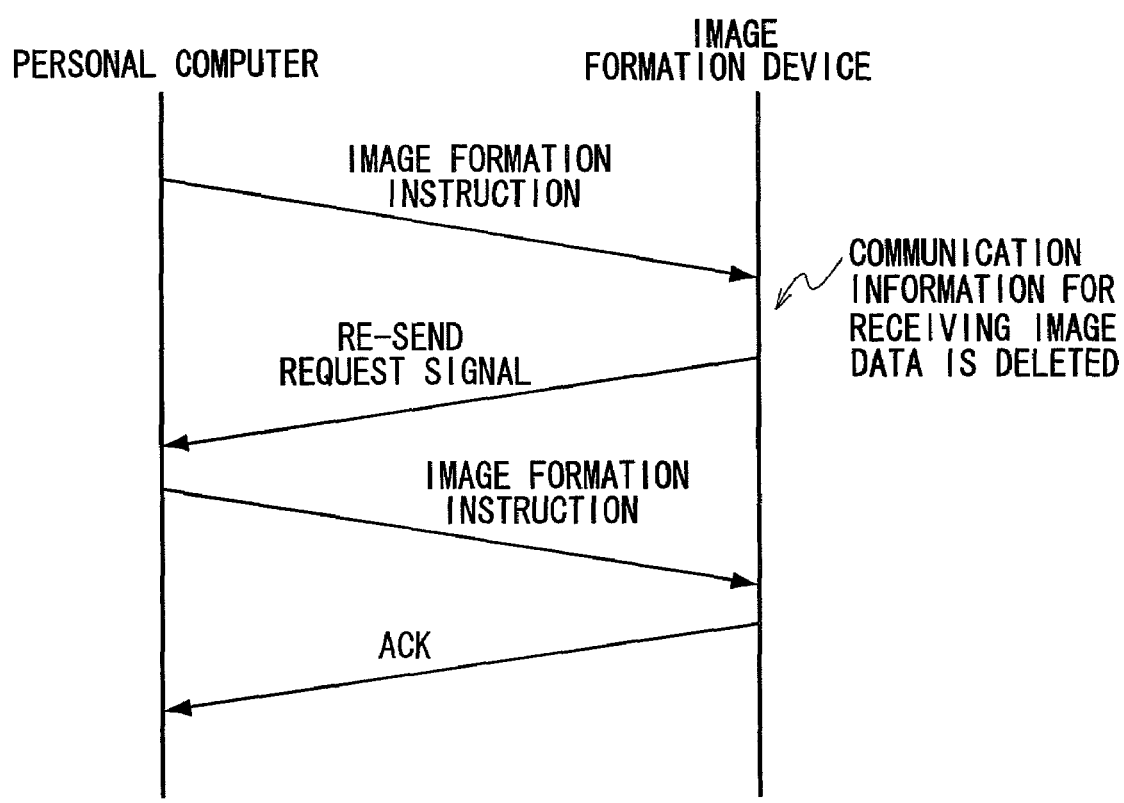
FIG. 7 is a diagram for describing an example of signals that are sent and received when a re-send of communication information is requested when the communication information has been deleted from the image processing buffer.

That is, in this case, as shown in FIG. 7, when an image processing instruction from one of the personal computers 12 is implemented at the image forming device 10 and then communication information of image processing instructions memorized in the image processing buffer 34 is deleted in order to receive image data at the image forming device 10, re-send request signals for requesting re-sending of communication information are outputted by the CPU 16 of the image forming device 10 to devices (the personal computers 12) and the like that are connected to the network 14. Hence, image formation instructions are re-sent from external devices such as the personal computers 12 and the like, ACK signals are outputted from the image forming device 10, and it is possible to obtain the deleted communication information.

In addition, the exemplary embodiments described hitherto may be implemented by a program which realizes the functions thereof with a computer structured with the CPU 16, ROM 17 and main memory 18 of the image forming device 10 of FIG. 2. Such a case may be an example in which the program is memorized in the ROM 17 or the like, and it is possible for the program to be provided saved on a recording medium such as a CD-ROM or the like.

What is claimed is:

1. A communication information processing device comprising:
    a reception component that receives communication information through an external communication line;
    an image processing component that performs image processing on image information;
    a memory component that is provided for memorizing image information for image processing by the image processing component, and that memorizes image information and the communication information received by the reception component; and
    a control component that, when a pre-specified setting condition is satisfied, controls the memory component so as to delete the communication information memorized in the memory component and to memorize image information to be used by the image processing component as a priority.

2. The communication information processing device of claim 1, wherein the setting condition includes that the reception component has received an image formation instruction.

3. The communication information processing device of claim 1, wherein the setting condition includes that an information quantity of the communication information memorized by the memory component either is at least or is greater than a pre-specified quantity.

4. The communication information processing device of claim 1, wherein the control information that the control component deletes is control information that will be re-sent through the external communication line.

5. A communication information processing system comprising:
    an external device that sends communication information, and re-sends communication information in response to a request for a re-send of communication information; and
    a communication information processing device,
    wherein the communication information processing device includes:

a reception component that receives communication information sent from the external device through an external communication line;

an image processing component that performs image processing on image information;

a memory component that is provided for memorizing image information for image processing by the image processing component, and that memorizes image information and the communication information received by the reception component;

a control component that, when a pre-specified setting condition is satisfied, controls the memory component so as to delete the communication information memorized in the memory component and to memorize image information to be used by the image processing component as a priority; and a re-send request component that, when the communication information has been deleted by the control component, implements a request to the external device to re-send the communication information.

6. The communication information processing system of claim 5, wherein the setting condition includes that the reception component has received an image formation instruction.

7. The communication information processing system of claim 5, wherein the setting condition includes that an information quantity of the communication information memorized by the memory component either is at least or is greater than a pre-specified quantity.

8. The communication information processing system of claim 5, wherein the control information that the control component deletes is control information that will be re-sent through the external communication line.

9. A storage medium readable by a computer, the storage medium storing a program of instructions executable by the computer to perform a function for communication information processing, the function comprising:

(a) receiving communication information through an external communication line;

(b) performing image processing on image information; and (c) when a pre-specified setting condition is satisfied, controlling a memory component, which is provided for memorizing image information for image processing in (b) and which memorizes image information and the communication information received in (a), so as to delete the communication information memorized in the memory component and to memorize image information to be used in (b) as a priority.

10. The storage medium of claim 9, wherein the setting condition includes that an image formation instruction has been received.

11. The storage medium of claim 9, wherein the setting condition includes that an information quantity of the communication information memorized by the memory component either is at least or is greater than a pre-specified quantity.

12. The storage medium of claim 9, wherein the control information that is deleted in (c) is control information that will be re-sent through the external communication line.

13. A method that processes communication information, the method comprising:

(a) receiving communication information through an external communication line;

(b) performing image processing on image information; and (c) when a pre-specified setting condition is satisfied, controlling a memory component, which is provided for memorizing image information for image processing in (b) and which memorizes image information and the communication information received in (a), so as to delete the communication information memorized in the memory component and to memorize image information to be used in (b) as a priority.

14. The method of claim 13, wherein the setting condition includes that an image formation instruction has been received.

15. The method of claim 13, wherein the setting condition includes that an information quantity of the communication information memorized by the memory component either is at least or is greater than a pre-specified quantity.

16. The method of claim 13, wherein the control information that is deleted in (c) is control information that will be re-sent through the external communication line.

* * * * *